United States Patent
Hammond et al.

(10) Patent No.: US 9,641,176 B2
(45) Date of Patent: May 2, 2017

(54) SECURE SWITCH ASSEMBLY

(71) Applicant: Raytheon Company, Waltham, MA (US)

(72) Inventors: Matthew L. Hammond, McKinney, TX (US); Norman W. Cramer, Flower Mound, TX (US); Robert G. Kressig, II, Garland, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/804,851

(22) Filed: Jul. 21, 2015

(65) Prior Publication Data

US 2017/0026040 A1 Jan. 26, 2017

(51) Int. Cl.
*G06F 12/14* (2006.01)
*H03K 19/003* (2006.01)
*H03K 19/177* (2006.01)

(52) U.S. Cl.
CPC ..... *H03K 19/003* (2013.01); *H03K 19/17736* (2013.01)

(58) Field of Classification Search
None
See application file for complete search history.

(56) References Cited

U.S. PATENT DOCUMENTS

| 6,499,124 B1 * | 12/2002 | Jacobson | G01R 31/31719 |
| | | | 714/726 |
| 6,733,183 B2 | 5/2004 | Gregory | |
| 6,976,118 B1 | 12/2005 | Baier | |
| 6,996,713 B1 * | 2/2006 | Trimberger | G06F 21/76 |
| | | | 713/161 |
| 7,245,134 B2 | 7/2007 | Granicher | |
| 7,596,651 B2 | 9/2009 | Blinick | |

(Continued)

FOREIGN PATENT DOCUMENTS

| CN | 101969378 | | 2/2011 |
| FR | 2918779 | * | 1/2009 |
| FR | 2918779 A1 | | 1/2009 |

OTHER PUBLICATIONS

Ed Hallett, "Isolation Design Flow for Xilinx 7 Series FPGAs or Zynq-7000 AP SoCs (ISE Tools)", Feb. 5, 2015, Retrieved from: <URL:http://www.xilinx.com/support/documentation/application notes/xapp1086-secure-single-fpga-using-7s-idf.pdf>, pp. 1-57.

(Continued)

*Primary Examiner* — Crystal L Hammond
(74) *Attorney, Agent, or Firm* — Cantor Colburn LLP

(57) ABSTRACT

A secure switch assembly is provided and includes inputs respectively associated with at least first and second security levels, switch element outputs respectively associated with the at least first and second security levels and a field programmable gate array (FPGA) operably interposed between the inputs and the switch element outputs. The FPGA has a first side facing the inputs and a second side facing the switch element outputs and includes a gate array. The gate array is programmable to generate entirely separate physical interconnections extending from the first side to the second side by which each of the first security level associated inputs and switch element outputs are connectable and each of the second security level associated inputs and switch element outputs are connectable.

20 Claims, 5 Drawing Sheets

(56) References Cited

U.S. PATENT DOCUMENTS

| | | | |
|---|---|---|---|
| 7,779,254 B1 | 8/2010 | Crosmer | |
| 7,840,000 B1 | 11/2010 | Marek | |
| 7,898,283 B1* | 3/2011 | Koushanfar | G06F 21/72 326/47 |
| 8,159,259 B1 | 4/2012 | Lewis | |
| 8,479,260 B2 | 7/2013 | Price | |
| 8,654,772 B2 | 2/2014 | Hadi Salim | |
| 8,713,327 B1* | 4/2014 | Peterson | G06F 21/72 326/8 |
| 8,769,172 B2* | 7/2014 | Soffer | G06F 3/023 710/62 |
| 8,958,414 B1 | 2/2015 | Wong | |
| 9,047,474 B1* | 6/2015 | Ahmad | G06F 21/575 |
| 9,213,866 B1* | 12/2015 | Ahmad | G06F 21/76 |
| 9,444,827 B2* | 9/2016 | Chritz | H04L 63/1408 |
| 2003/0131228 A1* | 7/2003 | Twomey | H04L 29/06 713/153 |
| 2005/0114710 A1* | 5/2005 | Cornell | G06F 21/57 726/4 |
| 2007/0255942 A1 | 11/2007 | Weller | |
| 2011/0228779 A1* | 9/2011 | Goergen | H04L 49/40 370/392 |
| 2014/0006676 A1* | 1/2014 | Chandrasekhar | G06F 13/36 710/316 |
| 2014/0041040 A1* | 2/2014 | Potkonjak | G06F 21/64 726/26 |
| 2014/0052309 A1* | 2/2014 | Chandrasekhar | G06F 1/26 700/297 |
| 2014/0059370 A1* | 2/2014 | Loffink | H04L 49/40 713/323 |
| 2014/0115340 A1* | 4/2014 | Lee | H04L 63/08 713/182 |
| 2014/0142725 A1* | 5/2014 | Boyd | G05B 19/0421 700/28 |
| 2014/0143527 A1* | 5/2014 | Boyd | G06F 13/409 713/1 |
| 2014/0149658 A1* | 5/2014 | Boyd | G06F 3/0607 711/112 |
| 2014/0173072 A1* | 6/2014 | Chandrasekhar | G06F 9/00 709/223 |
| 2014/0215458 A1* | 7/2014 | Devarapalli | G06F 9/455 718/1 |
| 2014/0281990 A1* | 9/2014 | Gu | G08B 13/19684 715/719 |
| 2015/0130506 A1* | 5/2015 | Bhunia | H01L 24/49 326/8 |
| 2015/0237058 A1* | 8/2015 | Chritz | H04L 63/1408 726/23 |
| 2016/0077841 A1* | 3/2016 | Lambert | G06F 13/4022 713/2 |
| 2016/0191374 A1* | 6/2016 | Singh | H04L 41/00 370/228 |
| 2016/0248852 A1* | 8/2016 | Lambert | H04L 67/1095 |
| 2016/0267041 A1* | 9/2016 | Jose | G06F 13/4221 |

OTHER PUBLICATIONS

ISR/WO, Issued Jul. 22, 2016, RAY0306PCT, PCT Application No. PCT/US2016/033224, 12 pages.

* cited by examiner

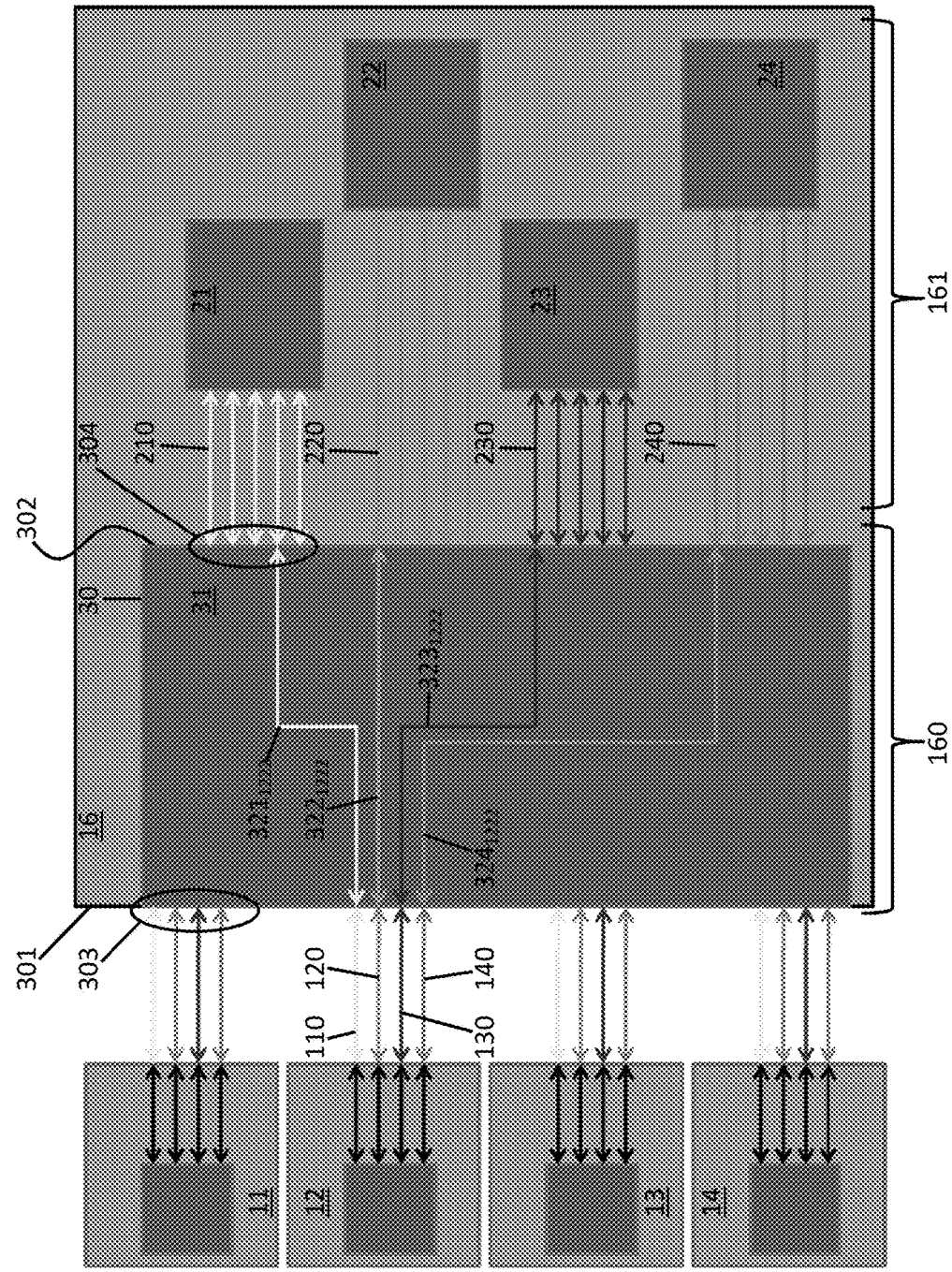

SECURE SWITCH ASSEMBLY

BACKGROUND

The present invention relates to a switch assembly and, more specifically, to a secure switch assembly for use in military aircraft.

In commercial operations, Ethernet fabrics are changed by reconfiguring the Ethernet switch's configuration registers to change the mapping of the fabric. Military applications have a more rigorous requirement, however, in that contractors are required to show physical separation so that data of one channel cannot be detected on other channels. This separation must be demonstrated in order to verify the design.

SUMMARY

According to one embodiment of the present invention, a secure switch assembly is provided and includes inputs respectively associated with at least first and second security levels, switch element outputs respectively associated with the at least first and second security levels and a field programmable gate array (FPGA) operably interposed between the inputs and the switch element outputs. The FPGA has a first side facing the inputs and a second side facing the switch element outputs and includes a gate array. The gate array is programmable to generate entirely separate physical interconnections extending from the first side to the second side by which each of the first security level associated inputs and switch element outputs are connectable and each of the second security level associated inputs and switch element outputs are connectable.

According to another embodiment of the present invention, a secure switch assembly is provided and includes computing devices each having inputs respectively associated with at least first and second security levels, switch elements each having switch element outputs respectively associated with the at least first or second security levels and a field programmable gate array (FPGA) operably interposed between the inputs and the switch element outputs. The FPGA has a first side facing the inputs and a second side facing the switch element outputs and includes a gate array that is programmable to generate entirely separate physical interconnections extending from the first side to the second side by which each of the first security level associated inputs and switch element outputs are connectable for enabling computing device-switch element communication and each of the second security level associated inputs and switch element outputs are connectable for enabling computing device-switch element communication.

According to another embodiment of the present invention, a secure switch assembly is provided and includes first and second computing devices each having inputs associated with at least first and second security levels, respectively, first and second switch elements each having switch element outputs associated with the at least first and second security levels, respectively, and a field programmable gate array (FPGA) operably interposed between the inputs and the switch element outputs. The FPGA has a first side facing the inputs and a second side facing the switch element outputs and includes a gate array that is programmable to generate entirely separate physical interconnections extending from the first side to the second side by which each of the first security level associated inputs and switch element outputs are connectable for enabling first computing device-first switch element communication and each of the second security level associated inputs and switch element outputs are connectable for enabling second computing device-second switch element communication.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTIONS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 is a schematic illustration of a multi-domain implementation of the simple secure switch hardware configuration of FIG. 1 in accordance with alternative embodiments;

DETAILED DESCRIPTION

As will be described below, a simple secure switch assembly is provided as a mechanism to physically separate classified data from un-classified data into separate channels (e.g., Ethernet channels) in a simple and verifiable design. This design also allows for re-mapping the channel fabric during operation as desired by the user. In some, but not necessarily all cases, the Simple Secure Switch utilizes commercial off-the-shelf (COTS) Ethernet switches in order to avoid having to verify the switch design for separation and uses a field programmable gate array (FPGA) to physically separate Ethernet lanes of varying classification. The design uses a minimal amount of code in order to make the government verification process as streamlined as possible and to guarantee that the data does not cross classification boundaries. This also allows the switch fabric to be switched while in operation enabling an architecture that can be changed depending on the mission phase.

Figure 1:
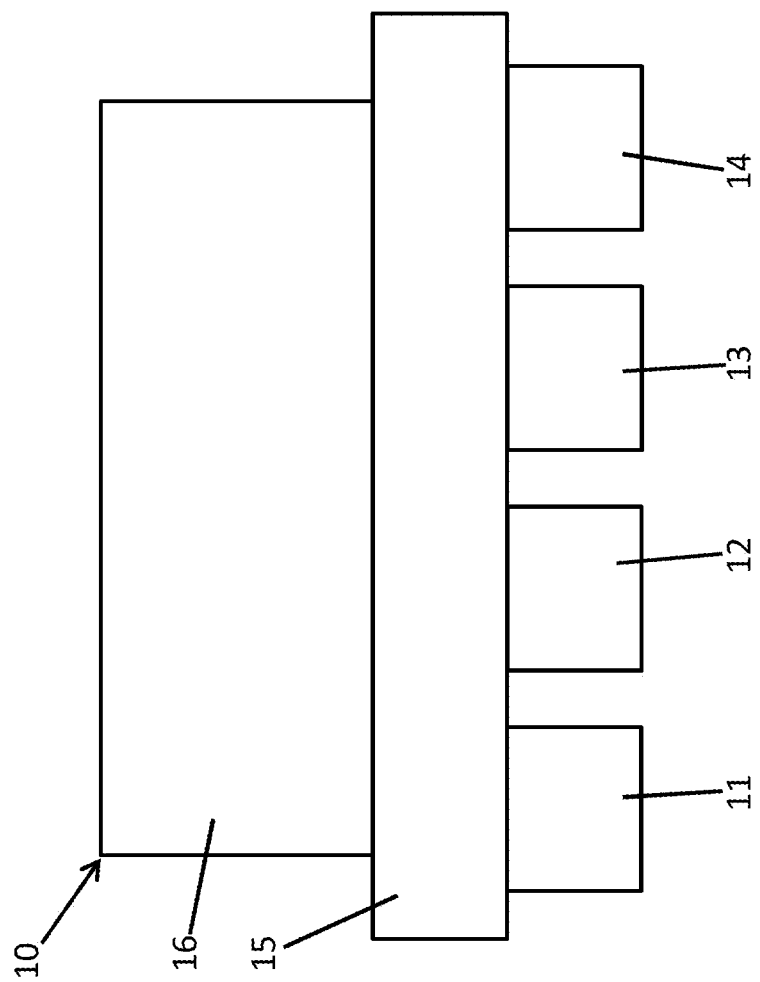
FIG. 1 is a schematic view of a simple secure switch hardware configuration.

With reference to FIG. 1, a secure switch assembly 10 is provided and includes multiple computing devices (e.g., first computing device 11, second computing device 12, third computing device 13 and fourth computing device 14), a backplane element 15 and a switch card 16. The multiple computing devices are connected to the switch card 16 by the backplane element 15 whereby the multiple computing devices are communicative with each other and with switches located on the switch card 16 via the backplane element 15.

Figure 2:
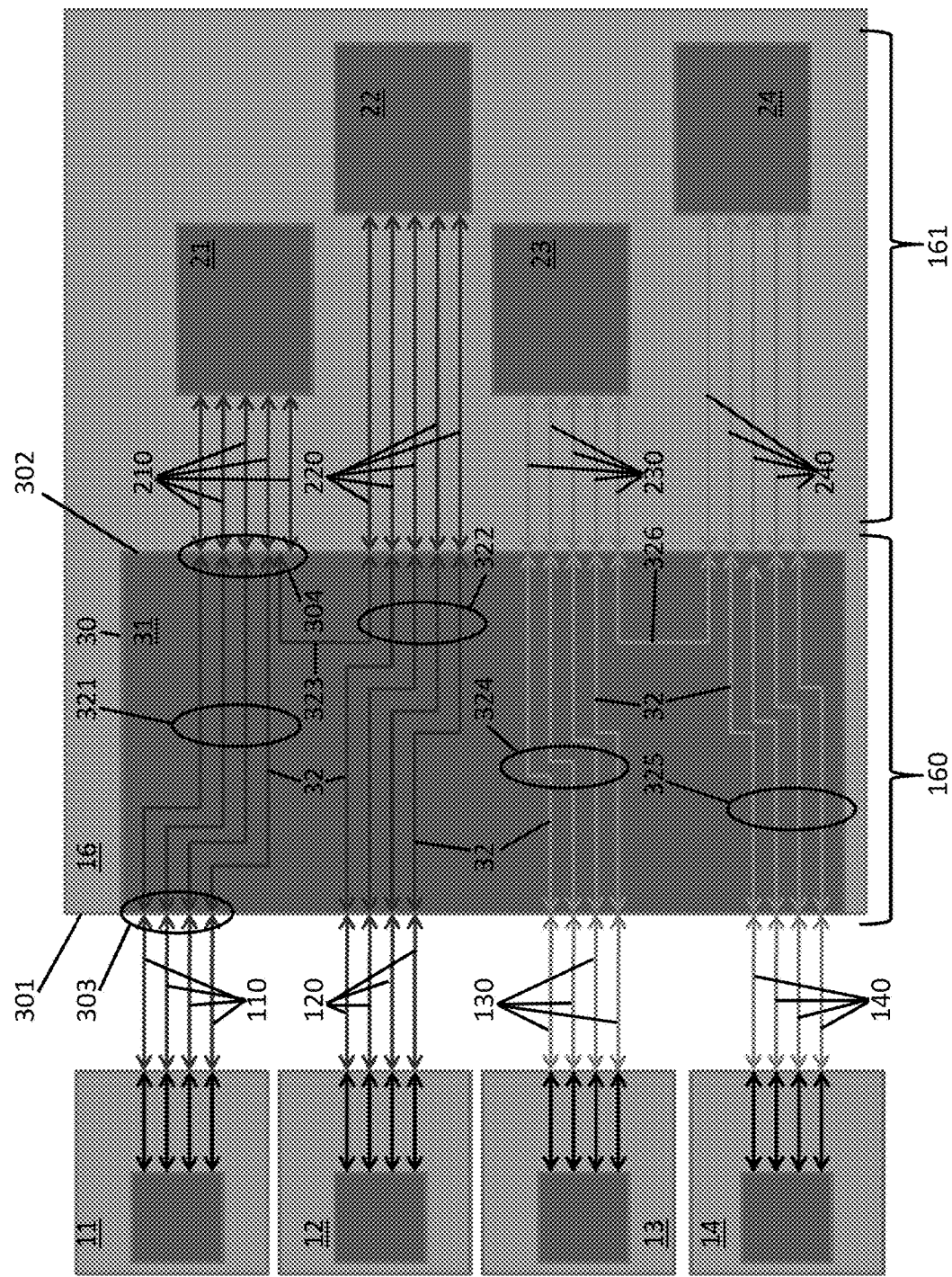
FIG. 2 is a schematic illustration of a multi-domain implementation of the simple secure switch hardware configuration of FIG. 1 in accordance with embodiments.

In accordance with embodiments and, as shown in FIG. 2, the first and second computing devices 11 and 12 each have inputs 110 and 120 that are respectively associated with a first domain or security level. Conversely, the third and fourth computing devices 13 and 14 each have inputs 130 and 140 that are respectively associated with a second domain or security level. At the same time, the switch card 16 may include a field programmable gate array (FPGA) element 30 and multiple switch elements (e.g., first switch element 21, second switch element 22, third switch element 23 and fourth switch element 24). The first and second switch elements 21 and 22 each have switch element outputs 210 and 220 that are respectively associated with the first domain or security level while the third and fourth switch elements 23 and 24 each have switch element outputs 230 and 240 that are respectively associated with the second domain or security level.

In the embodiment of FIG. 2, the multiple switch elements may be, but do not need to be, provided as commercial off-the-shelf (COTS) Ethernet switches. More generally, the multiple switch elements may be provided as high speed switch interfaces, such as Serial Rapid Input Output (SRIO) switches, PCIe elements or Ethernet switches. The inputs 110, 120, 130 and 140 may be local to the multiple computing devices or defined along the backplane element 16. The switch element outputs 210, 220, 230 and 240 may be defined in the switch card 16. The FPGA element 30 is operably interposed between the inputs 110, 120, 130 and 140 and the switch element outputs 210, 220, 230 and 240. The FPGA element 30 has a first side 301 that is disposed to face the inputs 110, 120, 130 and 140 and a second side 302 that is disposed to face the switch element outputs 210, 220, 230 and 240. At the first side 301, the FPGA element 30 includes a plurality of modular input interfaces 303, which are connectable with any of the inputs 110, 120, 130 and 140. Similarly, at the second side 302, the FPGA element 30 includes a plurality of modular output interfaces 304, which are connectable with any of the switch element outputs 210, 220, 230 and 240.

As described herein, the first and second computing devices 11 and 12 may be provided as aircraft computing devices that monitor or handle computational loads that are subject to low-level security clearance requirements such as pilot/crew environmental settings, date and time settings, etc. In a similar manner, the first and second switch elements 21 and 22 handle communications of data relating to each other or the first and second computing devices 11 and 12. That is, the first and second switch elements 21 and 22 transmit and receive data that is subject to only low-level security clearance requirements. By contrast, the third and fourth computing devices 13 and 14 may be provided as aircraft computing devices that monitor or handle computational loads that are subject to high-level security clearance requirements such as pilot/crew identities, mission plans, weapons controls, etc. In a similar manner, the third and fourth switch elements 23 and 24 handle communications of data relating to each other and the third and fourth computing devices 13 and 14. That is, the third and fourth switch elements 23 and 24 transmit and receive data that is subject to only high-level security clearance requirements.

The FPGA element 30 includes a gate array 31 that is programmable to generate entirely separate physical interconnections 32. These physical interconnections 32 extend from any one of the modular input interfaces 303 at the first side 301 to any one of the modular output interfaces 304 at the second side 302.

With the physical interconnections 32 generated and with each of the inputs 110 of the first computing device 11, each of the inputs 120 of the second computing device 12, each of the switch element outputs 210 of the first switch element 21 and each of the switch element outputs 220 of the second switch element 22 associated with the first domain or security level, at least the first computing device 11 and the first switch element 21 are connectable and the second computing device 12 and the second switch element 22 are connectable.

In greater detail, the physical interconnections 32 include first physical interconnections 321 by which the inputs 110 of the first computing device 11 are connectable with the switch element outputs 210 of the first switch element 21, second physical interconnections 322 by which the inputs 120 of the second computing device 12 are connectable with the switch element outputs 220 of the second switch element 22 and third physical interconnections 323 by which switch element outputs 210 and 220 of the first and second switch elements 21 and 22 are connectable with each other.

Similarly, with the physical interconnections 32 generated and with each of the inputs 130 of the third computing device 13, each of the inputs 140 of the fourth computing device 14, each of the switch element outputs 230 of the third switch element 23 and each of the switch element outputs 240 of the fourth switch element 24 associated with the second domain or security level, at least the third computing device 13 and the third switch element 23 are connectable and the fourth computing device 14 and the fourth switch element 24 are connectable.

In greater detail, the physical interconnections 32 include fourth physical interconnections 324 by which the inputs 130 of the third computing device 13 are connectable with the switch element outputs 230 of the third switch element 23, fifth physical interconnections 325 by which the inputs 140 of the fourth computing device 14 are connectable with the switch element outputs 240 of the fourth switch element 24 and sixth physical interconnections 326 by which switch element outputs 230 and 240 of the third and fourth switch elements 23 and 24 are connectable with each other.

In accordance with alternative embodiments and, as shown in FIG. 3, the first computing device 11 has inputs 110, 120, 130 and 140 that are respectively associated with the first, second, third and fourth domains or security levels. In a similar fashion, the second, third and fourth computing devices 12, 13 and 14 all have inputs 11, 120, 130 and 140 that are respectively associated with the first, second, third and fourth domains or security levels (only inputs 110, 120, 130 and 140 for the second computing device 120 are shown for clarity and brevity). In this case, the switch card 16 includes the FPGA element 30 and the multiple switch elements (e.g., first switch element 21, second switch element 22, third switch element 23 and fourth switch element 24) where the first, second, third and fourth switch elements 21, 22, 23 and 24 all have switch element outputs 210, 220, 230 and 240 that are respectively associated with the first, second, third or fourth domains or security levels.

In the embodiment of FIG. 3, the multiple switch elements may be, but do not need to be, provided as commercial off-the-shelf (COTS) Ethernet switches. More generally, the multiple switch elements may be provided as high speed switch interfaces, such as Serial Rapid Input Output (SRIO) switches, PCIe elements or Ethernet switches. The inputs 110, 120, 130 and 140 for each of the multiple computing devices may be local to the multiple computing devices or defined along the backplane element 16. The switch element outputs 210, 220, 230 and 240 for each of the multiple switch elements may be defined in the switch card 16. The FPGA element 30 is operably interposed between each of the inputs 110, 120, 130 and 140 for each of the multiple computing devices and each of the switch element outputs 210, 220, 230 and 240 for each of the multiple switch elements. The FPGA element 30 again has the first side 301 that is disposed to face the inputs 110, 120, 130 and 140 and the second side 302 that is disposed to face the switch element outputs 210, 220, 230 and 240. At the first side 301, the FPGA element 30 includes the plurality of modular input interfaces 303, which are connectable with any of the inputs 110, 120, 130 and 140 for each of the multiple computing devices and, at the second side 302, the FPGA element 30 includes the plurality of modular output interfaces 304, which are connectable with any of the switch element outputs 210, 220, 230 and 240 for each of the multiple switch elements.

It is to be understood that although certain numbers of domains or security levels are described herein, the number of the domains or security levels can exceed what has been/is being described.

As described herein, the first computing device 11 may be provided as an aircraft computing device that monitors or handles computational loads that are subject to low-level security clearance requirements such as pilot/crew environmental settings, date and time settings, etc. In a similar manner, the first switch element 21 handles communications of data relating to the first computing device 11. That is, the first switch element 21 transmits and receives data that is subject to only low-level security clearance requirements. The second, third and fourth computing devices 12, 13 and 14 may also be provided as aircraft computing devices that monitor or handle computational loads that are subject to increasingly high-level security clearance requirements as compared to those of the first computing device 11. In a similar manner, the second, third and fourth switch elements 22, 23 and 24 handle communications of data relating to corresponding ones of the second, third and fourth computing devices 12, 13 and 14. That is, the second, third and fourth switch elements 22, 23 and 24 transmit and receive data that is subject to the increasingly high-level security clearance requirements.

As noted above, the FPGA element 30 includes the gate array 31 that is programmable to generate the entirely separate physical interconnections 32, which extend from any one of the modular input interfaces 303 at the first side 301 to any one of the modular output interfaces 304 at the second side 302.

With the physical interconnections 32 generated, with each of the inputs 110, 120, 130, 140 of each the multiple computing devices associated with the first-fourth domains or security levels and with each of the switch element outputs 210, 220, 230, 240 of the multiple switching elements associated with one of the first-fourth domain or security level, each of the multiple computing devices is connectable with each of the switch elements.

In greater detail, the physical interconnections 32 include first physical interconnection $321_{1222}$ by which the input 110 of the second computing device 12 is connectable with the switch element output 210 of the second switch element 22, second physical interconnection $322_{1222}$ by which the input 120 of the second computing device 12 is connectable with the switch element output 220 of the second switch element 22, third physical interconnection $323_{1222}$ by which the input 130 of the second computing device 12 is connectable with the switch element output 230 of the second switch element 22 and fourth physical interconnection $324_{1222}$ by which the input 140 of the second computing device 12 is connectable with the switch element output 240 of the second switch element 22 (similar physical interconnections for the other computing devices and switch elements would be routing similarly but are not shown for clarity and brevity).

As shown in FIGS. 2 and 3, the switch card 16 may be provided in various configurations but generally has a first portion 160 in which the FPGA element 30 is disposed and a second portion 161 in which the multiple switch elements are disposed. In some cases, the first side 301 of the FPGA element 30 may be co-planar with an edge of the first portion 160 while the second side 302 of the FPGA element 30 is disposed at or around a border between the first and second portions 160 and 161. In these cases, the first side 301 of the FPGA element 30 and the modular input interfaces 303 may be disposed adjacent to the backplane element 15 such that the inputs 110, 120, 130 and 140 are disposed on the backplane element 15 or are otherwise remote from the switch card 16 or the FPGA element 30. By contrast, the switch element outputs 210, 220, 230 and 240 traverse at least a section of the second portion 161 of the switch card 16.

In other cases, although not shown in FIG. 2 or 3, the modular input interfaces 303 and the modular output interfaces 304 may be disposed on a planar surface of the switch card 16 remote from either the first side 301 or the second side 302.

Figure 4:
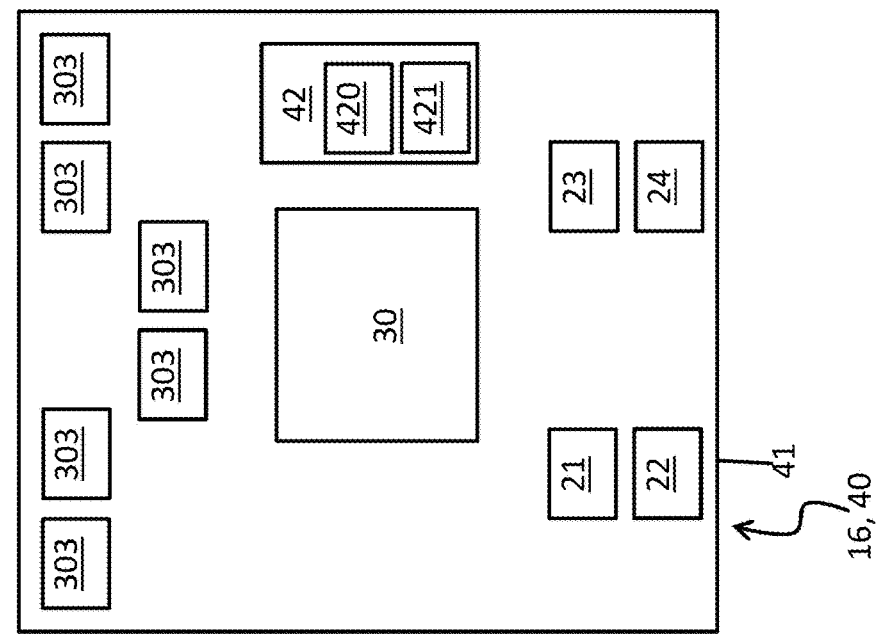
FIG. 4 is a plan view of a layout of a field programmable gate array (FPGA) in accordance with embodiments.

With reference to FIG. 4 and, in accordance with further embodiments, the switch card 16 may be provided as a multiple-input, simple secure switch 40 that includes multiple channel inputs on a single board computer (SBC) chassis 41. In such cases, the multiple-input, simple secure switch 40 includes the FPGA element 30 in a central region thereof such that the FPGA element 30 is communicative with the modular input interfaces 303, which are arranged in groups at a first end of the chassis 41, with the multiple switch elements, which are arranged in columns at a second end of the chassis, and with a control element 42.

As shown in FIG. 4, the control element 42 may be disposed on the chassis 41 (i.e., on the switch card 16) proximal to the FPGA element 30. In this or any other position, the control element 42 is configured to control a programming of the FPGA 30 such that the physical interconnections 32 are generated upon initialization of the secure switch assembly 10. That is, where the FPGA element 30 is installed on the switch card 16 of FIG. 2, the control element 42 programs the FPGA element 30 to generate the physical interconnections 32 illustrated in FIG. 2. By contrast, where the FPGA element 30 is installed on the switch card 16 of FIG. 3, the control element 42 programs the FPGA element 30 to generate the physical interconnections 32 illustrated in FIG. 3.

Figure 5:
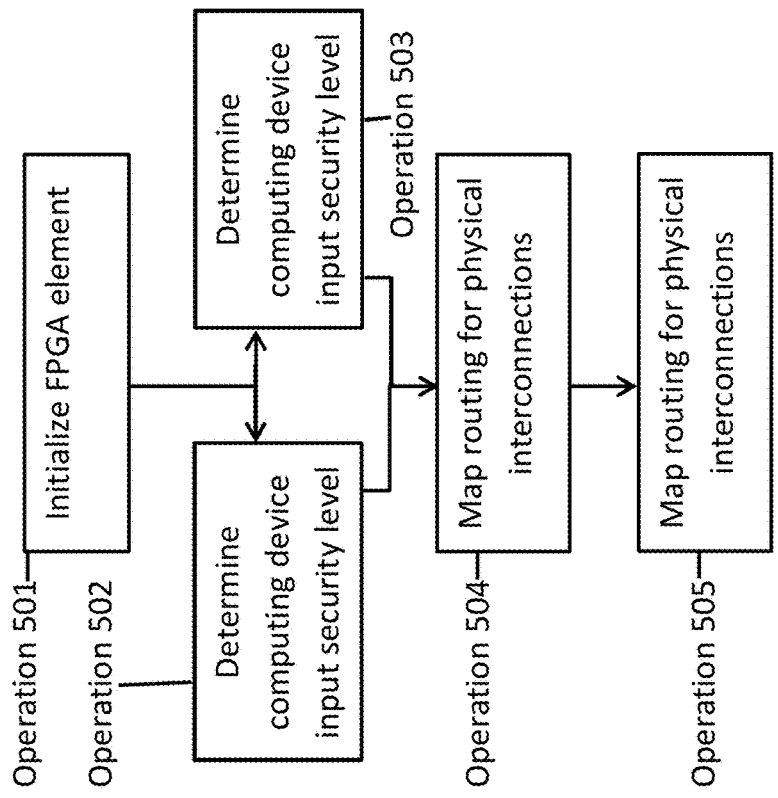
FIG. 5 is a flow diagram illustrating an operation of a control element in accordance with embodiments.

In accordance with embodiments and, with reference to FIGS. 4 and 5, the control element 42 may be provided as a processing unit 420 and a memory unit 421 having executable instructions stored thereon. When executed by, for example, an operator once the multiple computing devices are coupled with the switch card 16 with the multiple switch elements and the FPGA element 30 already installed thereon, the executable instructions cause the processing unit 420 to initialize the FPGA element 30 (operation 501). At this point, the processing unit 420 determines which, if any, domain or security level each input of each of the multiple computing devices is associated with (operation 502). In a parallel operation, the processing unit 420 also determines which, if any, domain or security level each switch element output of each of the multiple switch elements is associated with (operation 503). Subsequently, the processing unit 420 maps out a routing for each physical interconnection 32 needed by the FPGA element 30 (operation 504) and commands the FPGA element 30 to generate the physical interconnections 32 in accordance with the mapping (operation 505).

With the FPGA element 30 being programmable by the processing unit 420 of the control element 42, as explained above, the physical interconnections 32 can be generated on the FPGA element 30 such that further reference to the type of data or information carried along the physical interconnections 32 or to any domain or security level need not be made as long as the signals carried by the physical interconnections 32 traverse the extent of the FPGA element 30 from the first side 303 to the second side 304.

In the implementation illustrated in FIG. 2, the various physical interconnections 32 do not need to cross over one another in order to complete the computing device-switch element connections. However, in the implementation of FIG. 3, such cross-overs are necessary in order to complete the computing device-switch element connections. To this end, it is noted that a full description of the operation of the FPGA element 30 and of the generation of the physical interconnections 32 will not be provided herein but that descriptions of such subject matter can be found in the "Isolation Design Flow for Xilinx 7 Series FPGAs or Zynq-7000 AP SoCs (ISE Tools)," XAPP1086 (v1.3.1), Feb. 5, 2015 document, which is incorporated herein in its entirety by reference.

Figure 6:
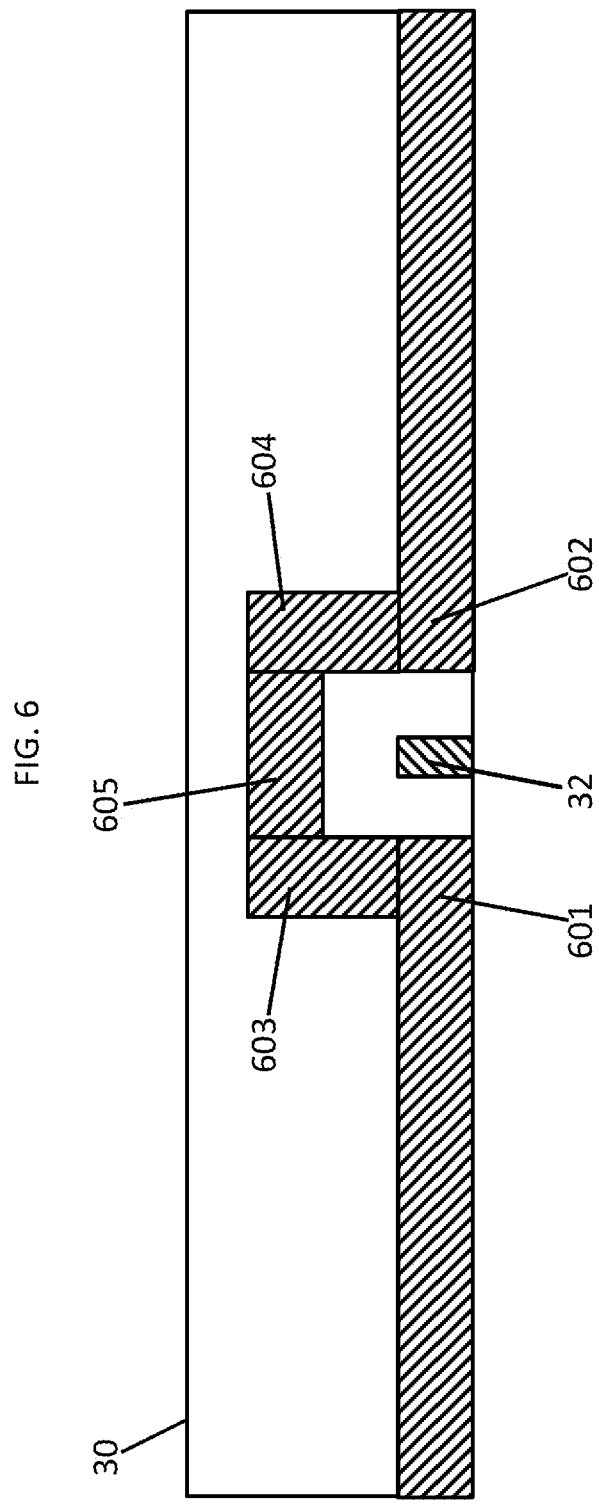
FIG. 6 is a schematic illustration of a physical interconnection crossing on the FPGA of FIG. 4 for at least the implementation of FIG. 3.

With the above in mind and, with reference to FIG. 6, the physical interconnections 32 that cross over one another may do so within the structure of the FPGA element 30 such that physical interconnections 32 are displaced from one another in multiple planes. That is, as shown in FIG. 6, the physical interconnections 32 may be, but are not required to be, generally disposed in a base plane P1. However, at locations where the physical interconnections 32 cross one another, at least one of the physical interconnections 32 may be provided with first and second horizontal terminals 601, 602, which are displaced from the physical interconnection 32 being crossed over. In this case, first and second vertical components 603, 604 are coupled to the first and second horizontal terminals 601, 602 and extend away from the base plane P1. A horizontal component 605 thus extends between distal ends of the first and second vertical components 603, 604 at a displaced plane P2 so that the horizontal component 605 is displaced from (i.e., suspended over) the physical interconnection 32 being crossed over.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A secure switch assembly, comprising:
  inputs respectively associated with at least first and second security levels;
  switch element outputs respectively associated with the at least first and second security levels; and
  a field programmable gate array (FPGA) operably interposed between the inputs and the switch element outputs,
  the FPGA having a first side facing the inputs and a second side facing the switch element outputs and comprising a gate array that is programmable to generate entirely separate physical interconnections extending from the first side to the second side by which:
    each of the first security level associated inputs and switch element outputs are connectable, and
    each of the second security level associated inputs and switch element outputs are connectable.

2. The secure switch assembly according to claim 1, further comprising a backplane by which the first side of the FPGA is connectable with the inputs.

3. The secure switch assembly according to claim 1, wherein the inputs comprise single board computing elements.

4. The secure switch assembly according to claim 1, further comprising high speed switch interfaces to which the switch element outputs are connectable.

5. The secure switch assembly according to claim 1, further comprising a card on which the FPGA, the switch element outputs and the high speed switch interfaces are disposable.

6. The secure switch assembly according to claim 5, further comprising a control element disposed on the card and configured to control a programming of the FPGA.

7. The secure switch assembly according to claim 1, wherein the physical interconnections are displaced from one another in a single plane.

8. The secure switch assembly according to claim 1, wherein the physical interconnections are partially disposed in a base plane and at least one of the physical interconnections comprises:
  first and second horizontal terminals in the base plane;
  first and second vertical terminals coupled to the first and second horizontal terminals, respectively, which extend away from the base plane; and
  a horizontal component extending between distal end of the first and second vertical terminals at a displaced plane.

9. A secure switch assembly, comprising:
  computing devices each having inputs respectively associated with at least first and second security levels;
  switch elements each having switch element outputs respectively associated with the at least first or second security levels; and a field programmable gate array (FPGA) operably interposed between the inputs and the switch element outputs, the FPGA having a first side facing the inputs and a second side facing the switch element outputs and comprising a gate array that is programmable to generate entirely separate physical interconnections extending from the first side to the second side by which:

each of the first security level associated inputs and switch element outputs are connectable for enabling computing device-switch element communication, and each of the second security level associated inputs and switch element outputs are connectable for enabling computing device-switch element communication.

10. The secure switch assembly according to claim 9, further comprising a backplane by which the first side of the FPGA is connectable with the inputs.

11. The secure switch assembly according to claim 9, wherein the switch elements comprise high speed switch interfaces.

12. The secure switch assembly according to claim 9, further comprising a card on which the FPGA, the switch element outputs and the switch elements are disposable.

13. The secure switch assembly according to claim 12, further comprising a control element disposed on the card and configured to control a programming of the FPGA.

14. The secure switch assembly according to claim 9, wherein the physical interconnections are partially disposed in a base plane and at least one of the physical interconnections comprises:

first and second horizontal terminals in the base plane;

first and second vertical terminals coupled to the first and second horizontal terminals, respectively, which extend away from the base plane; and a horizontal component extending between distal end of the first and second vertical terminals at a displaced plane.

15. A secure switch assembly, comprising:

first and second computing devices each having inputs associated with at least first and second security levels, respectively;

first and second switch elements each having switch element outputs associated with the at least first and second security levels, respectively; and a field programmable gate array (FPGA) operably interposed between the inputs and the switch element outputs, the FPGA having a first side facing the inputs and a second side facing the switch element outputs and comprising a gate array that is programmable to generate entirely separate physical interconnections extending from the first side to the second side by which:

each of the first security level associated inputs and switch element outputs are connectable for enabling first computing device-first switch element communication, and each of the second security level associated inputs and switch element outputs are connectable for enabling second computing device-second switch element communication.

16. The secure switch assembly according to claim 15, further comprising a backplane by which the first side of the FPGA is connectable with the inputs.

17. The secure switch assembly according to claim 15, wherein the switch elements comprise high speed switch interfaces.

18. The secure switch assembly according to claim 15, further comprising a card on which the FPGA, the switch element outputs and the switch elements are disposable.

19. The secure switch assembly according to claim 18, further comprising a control element disposed on the card and configured to control a programming of the FPGA.

20. The secure switch assembly according to claim 15, wherein the physical interconnections are displaced from one another in a single plane.

\* \* \* \* \*